May 18, 1926.                              1,585,339
A. G. FITZ GERALD
PNEUMATIC TIRE
Filed Dec. 22  1923
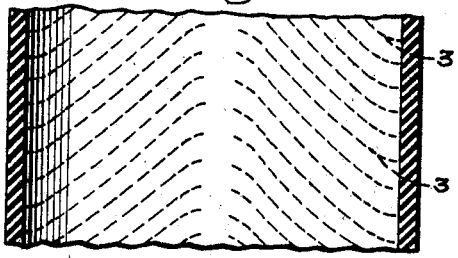
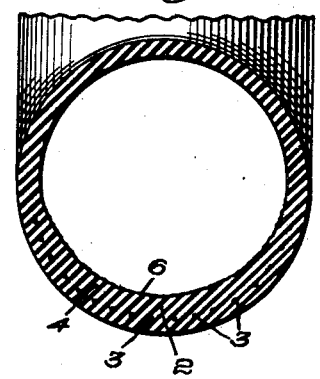
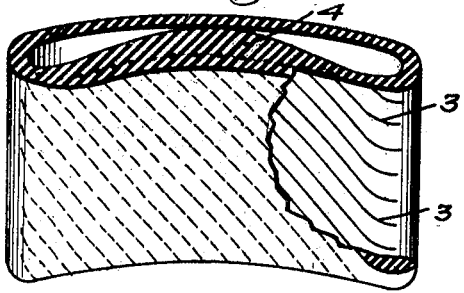
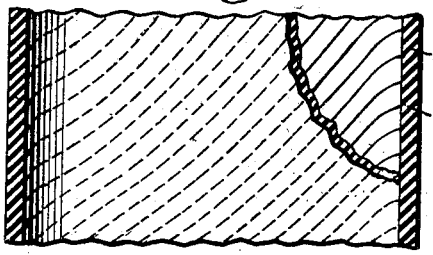
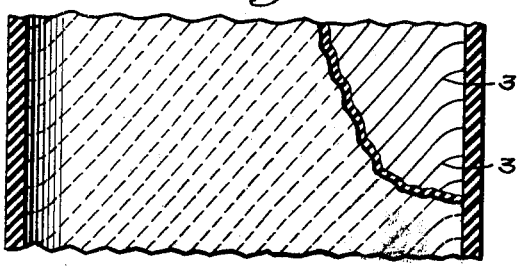
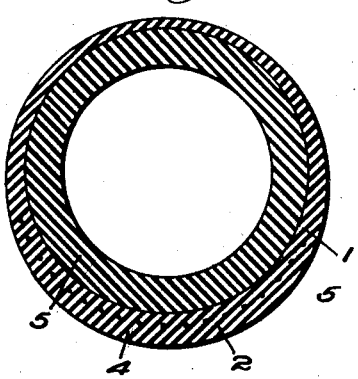
Inventor:
Arthur G. Fitz Gerald.
by Emery, Booth, Janney & Varney
Attys.

Patented May 18, 1926.

1,585,339

UNITED STATES PATENT OFFICE.

ARTHUR G. FITZ GERALD, OF BROOKLINE, MASSACHUSETTS.

PNEUMATIC TIRE.

Application filed December 22, 1923. Serial No. 682,187.

This invention relates to pneumatic tires, whether used alone as such or, as inner tubes as they are commonly termed, within outer shoes or casings, and its object is to provide an improved tire having, among others, the particular advantages hereinafter pointed out.

In the accompanying drawings of one embodiment of my invention selected for illustration and description, Fig. 1 is a cross sectional view of the tire as formed upon a mandrel inside out;

Fig. 2, a similar view of the tire after being stripped from the mandrel and turned to its proper condition;

Fig. 3, a similar view of the tire inflated and ready for use;

Fig. 4, a cross section of the tire in perspective, the tread partly broken away showing the arrangement of the tire compressing elements under normal conditions;

Fig. 5, a horizontal cross section of the tire on the line 5—5, Fig. 2, showing the natural position and relation of the compressing elements to the tire body;

Fig. 6, a similar view showing the position and relation of the tire compressing elements when the tube is inflated or when under external pressure, as when in use; and Fig. 7, a view similar to Fig. 5 of a modified form of construction, all the figures being on an enlarged scale.

The tire forming the subject matter of this application is an improvement upon the tires in use of the so called self-sealing-puncture type, a tire so constructed and arranged that, when inflated and in use, a portion of the material comprising the tread is under compression with a tendency not only to resist puncture, but to close or seal any puncture made therein, as for instance of the type shown in Patent No. 1,149,008, issued to Ira J. Webster, August 3, 1915.

Referring to the drawings of one embodiment of my invention, Fig. 1, my novel tire comprises a body of elastic material 1, as of rubber, a portion of the body being thickened at 2, to form the tread of the tire.

As is well known, when the common tire is inflated and in use, the tire is under tension from within and, if perforated, the tire tends at once to expand and enlarge the perforation with the result that the air escapes and the tire collapses.

When a tire of my novel construction, however, is inflated a part of the tread portion is held under compression, so that when a puncture occurs, the compressed rubber or other material tends to close the puncture to prevent collapse of the tire. To obtain this compression of a portion of the tire, Fig. 4, I embed in and secure adjacent to the tread of the tire structure, when making the same, a series of diagonally positioned compression members as threads 3, Figs. 1, 4, at any suitable angle to the side of the tire to wit 45°. These threads may be secured in any convenient and suitable manner and may be coated or frictioned with rubber or suitable material as one step in the process. The tire may be built up as on a mandrel 5, Fig. 1, by successive layers of rubber, the threads being positioned therebetween after a proper thickness has been obtained and then the thickened portion 2 of the tread constructed thereon by superimposing additional layers of rubber until the desired thickness is provided.

The tire so constructed is then stripped from the mandrel 5 and turned inside out, Fig. 3, thus making the thickened portion 2 the tread 4 of the tire. It will be obvious, Figs. 2, 3, that when the tire is turned, the extra thickness of tire material originally on the outer side of the tread, Fig. 1, will become part of the inner tire wall, Fig. 2, the threads 3 will restrain direct lateral expansion, the additional amount of tire material above the compressing elements 3, Fig. 2, will be compressed angularly thereby tightly together, forming a harder, more compact tread section 4, Fig. 3, with perhaps a more or less irregular inner surface 6.

This tightly compressed section 4 naturally offers unusual resistance to any article tending to puncture it and, if punctured, the material tends to close the opening instantly.

In order to obtain the necessary compression of the material it is desirable to use threads with but little, if any, elasticity, but of sufficient tensile strength to stand the stress due to inflation and shocks incident to use. If elastic threads are used, a certain amount of compression is of course lost.

When the tire is inflated and subjected to pressure from without, Fig. 6, and caused to yield in a generally combined lateral and diagonal direction, the diagonally disposed cords are free to flex circumferentially and diagonally of the tire and with the adjacent material are bent or distorted, Fig. 6, from their original positions, Fig. 5, sufficiently to permit the required diagonal expansion necessary, without losing the compression of the tread portion of the tube. Thus the diagonal positioning of the cords provides not only the required diagonal compression at all times with the self sealing puncture quality, but permits the desired diagonal expansion under certain conditions of the tire material by the equivalent of a stretching or lengthening of the threads or cords, viz., by changing their angularity relative to the sides of the tire, without breaking the connection between the cord ends and the material, and thus weakening the tire structure.

Again the advantage of my construction is noticeably apparent when it is desired to vulcanize a tire after a cut or blow out. To put the tube into the vulcanizer, it must be spread flat and so locked. If the cords run transversely of the tube as in the patent referred to, it is practically impossible to compress the tube sufficiently to lock it flat in the vulcanizer because there can be no substantial lateral stretching of the rubber except beyond the ends of the threads. If, however, the threads are disposed diagonally of the tube as in my novel construction, then the tube will stretch as above outlined and to the desired extent and lie substantially flat in the vulcanizer.

In the case of a so called self sealing puncture tire, wherein the threads run transversely of the tire, the threads being firmly embedded in the tire structure, cannot of course stretch, as already stated, and on the other hand the tire material will stretch laterally when inflated and under externally applied pressure, as the weight of the car, and so act to separate the cords at their ends from the tire material, thus fatally weakening the tire. If the usual fabric is used and cut on the bias, so that the cords run diagonally across the tread in opposite directions, crossing each other, those cords running in one direction will prevent the cords running in the other direction on the same side of the tread from flexing freely with the tread portion under compression from without. The result will be that the cords will become more or less separated from the rubber and thus lose their compressing power. Furthermore, in a tire of such construction, the cords being restrained from flexing freely with the tread, the rubber will be compressed in the V-shaped spaces between the oppositely angularly extended cords on either side of the tire as if it were between the two jaws of a pair of pliers, and will be pushed laterally of the tread from between the cords, separating the tread material from the cords, particularly near their ends, and thus preventing the cords from effecting the desired compression of the tread portion.

I have found that my novel construction will provide the necessary diagonal compression required to ensure the self sealing quality without danger of any increased or undue compression as pointed out above, and will also permit sufficient diagonal expansion of the tire material under pressure from within and without and avoid any tendency of the cords to separate at their ends from the tire material, thus obviating the objections to the tire of this type as now commonly made. In Fig. 7 I illustrate a modified form of construction wherein the threads are arranged diagonally but in so called herringbone fashion providing two adjacent angularly compressed sections. This arrangement of threads provides also satisfactory construction.

My invention is not limited to the particular embodiment thereof described and illustrated herein, but is more particularly pointed out in the appended claims.

Claims:—

1. In a pneumatic tire, a tread portion having a series of threads incorporated therein and extending diagonally across the tread and terminating substantially at the edges of the tread to cause compression of the tread portion when the tire is inflated.

2. In a pneumatic tire, a tread portion having a series of disconnected threads incorporated therein all extended throughout diagonally over the tread in the same direction to cause compression of the tread portion when inflated.

3. In a pneumatic tire, a thickened tread portion having cord like tread compression members unrestrainedly incorporated therein diagonally over the tread all in the same direction to effect a compression of the tread on inflation, the compression members being lengthwise movable diagonally with the tread portion.

4. In a pneumatic tire, a tread portion having a single series of compression members incorporated diagonally therein all in the same direction at both ends to permit unrestrained diagonal flexing of the tread portion under compression of the tread.

5. In a pneumatic tire, a tread portion having individual compression members incorporated diagonally therein all in the same direction throughout between the edges of the tread portion, the compression members being freely flexible together with the tread portion diagonally and longitudinally of the tread without separation of the tread from the compression members and without change of compression in the tread.

6. In a pneumatic tire, a tread portion having therein a series of individual tire compressing members positioned diagonally in the same direction throughout terminating at the sides of the tread and free to flex diagonally and circumferentially of the tire.

7. In a pneumatic tire, a tread portion, compression threads diagonally incorporated therein all extended in the same direction throughout and free to flex circumferentially and diagonally of the tire with the compressed portion.

8. A pneumatic tire having the thickened tread 4, and compression members 3 therein extended throughout their length diagonally across the tread all in the same direction, and terminating in the sides of the tire.

In testimony whereof, I have signed my name to this specification.

ARTHUR G. FITZ GERALD.